US010974395B2

(12) United States Patent
Seok et al.

(10) Patent No.: US 10,974,395 B2
(45) Date of Patent: Apr. 13, 2021

(54) METHOD AND SYSTEM FOR CONTROLLING INDOOR AUTONOMOUS ROBOT

(71) Applicant: NAVER LABS CORPORATION, Seongnam-si (KR)

(72) Inventors: Sangok Seok, Seongnam-si (KR); Dongwon Yoon, Seongnam-si (KR); Jinwon Chung, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 274 days.

(21) Appl. No.: 15/787,571

(22) Filed: Oct. 18, 2017

(65) Prior Publication Data

US 2018/0111274 A1    Apr. 26, 2018

(30) Foreign Application Priority Data

Oct. 21, 2016  (KR) ......................... 10-2016-0137713

(51) Int. Cl.
*G05B 19/04*     (2006.01)
*B25J 13/08*     (2006.01)
(Continued)

(52) U.S. Cl.
CPC ........... *B25J 13/089* (2013.01); *B25J 9/0003* (2013.01); *G05D 1/0027* (2013.01);
(Continued)

(58) Field of Classification Search
CPC ......... G06N 3/008; G06N 5/04; B25J 13/089; B25J 9/0003; B25J 9/161; B25J 9/1679;
(Continued)

(56) References Cited

U.S. PATENT DOCUMENTS

| 8,386,078 B1* | 2/2013 | Hickman | G06F 16/182 |
| | | | 700/245 |
| 2016/0188977 A1* | 6/2016 | Kearns | G05D 1/0274 |
| | | | 348/113 |
| 2016/0334800 A1* | 11/2016 | Han | G05D 1/0274 |

FOREIGN PATENT DOCUMENTS

| KR | 1020050024840 | 3/2011 |
| WO | 2016166983 A1 | 10/2016 |

OTHER PUBLICATIONS

Japanese Office Action issued in corresponding Japanese patent application No. 2017-201593, dated Feb. 25, 2020.

* cited by examiner

*Primary Examiner* — Harry Y Oh
(74) *Attorney, Agent, or Firm* — Greer Burns & Crain Ltd.

(57) ABSTRACT

A method and system for controlling an indoor autonomous robot. A method of controlling an indoor autonomous driving of a robot in a cloud system includes receiving, by the cloud system, first sensing data that is generated by a mapping robot autonomously driving in a target facility using a first sensor that detects the first sensing data with respect to an inside of the target facility; generating an indoor map of the target facility based on the first sensing data; receiving, from a service robot present in the target facility through a network, second sensing data that is generated by the service robot using a second sensor that detects the second sensing data with respect to the inside of the target facility; and controlling an indoor autonomous driving of the service robot with respect to the target facility based on the second sensing data and the generated indoor map.

14 Claims, 9 Drawing Sheets

(51) Int. Cl.
*G05D 1/02* (2020.01)
*B25J 9/00* (2006.01)
*G05D 1/00* (2006.01)
*G06F 8/33* (2018.01)

(52) U.S. Cl.
CPC ......... *G05D 1/0274* (2013.01); *G05D 1/0297* (2013.01); *G06F 8/33* (2013.01); *G05D 1/0246* (2013.01); *G05D 2201/0207* (2013.01)

(58) Field of Classification Search
CPC ...... B25J 9/1671; B25J 9/0084; B25J 9/1661; B25J 9/1602; B25J 9/163; B25J 9/1664; B25J 9/1682; B25J 11/0005; B25J 11/003; B25J 5/005; B25J 9/1617; B25J 9/1674; B25J 9/1676; B25J 9/1692; B25J 9/1697; G05D 1/0027; G05D 1/0274; G01N 33/00; G05B 15/02; G05B 2219/2642; G05B 2219/39168; G05B 19/4187; G05B 2219/39117; G05B 2219/39146; G05B 2219/40095; G05B 19/418; G05B 2219/39106; G05B 2219/39107; G05B 2219/40053; G05B 19/4086; G05B 2219/33125; G05B 2219/36056; G05B 2219/36425; G05B 2219/39376; G05B 2219/39413; G05B 2219/39449; G05B 2219/39451; G05B 2219/40099; G05B 2219/40264; G05B 2219/40408; G05B 2219/40411; G05B 2219/40512

See application file for complete search history.

METHOD AND SYSTEM FOR CONTROLLING INDOOR AUTONOMOUS ROBOT

CROSS-REFERENCE TO RELATED APPLICATION(S)

This application claims priority under 35 U.S.C. § 119 to Korean Patent Application No. 10-2016-0137713 filed on Oct. 21, 2016, in the Korean Intellectual Property Office (KIPO, the entire contents of which are incorporated herein by reference.

BACKGROUND

Field

One or more example embodiments relate to a method and system for controlling an indoor autonomous robot.

Description of Related Art

An autonomous robot is a robot that determines an optimal path to a destination using wheels or legs while looking around and detecting obstacles by itself. Autonomous robots have been developed and utilized for various fields, such as autonomous vehicles, logistics, hotel services, and robot cleaners. For example, Korean Patent Laid-Open Publication No. 10-2005-0024840 relates to a path planning method for an autonomous mobile robot, and discloses a method of planning an optimal path through which an autonomously mobile robot may safely and quickly move, within a home or office, to a target point while avoiding obstacles.

FIG. 1 is a diagram illustrating an example of a basic technique applied to a robot for indoor autonomous driving according to a related art. FIG. 1 illustrates a mapping module 110, a localization module 120, a path planning module 130, an obstacle avoidance module 140, and a sensing module 150 that are modules configured to implement techniques that can be applied to a service robot 100 according to the related art.

The mapping module 110 may include a technique for generating a peripheral map while the service robot 100 is autonomously driving and/or it may include a technique for importing and managing an already prepared map. For example, while travelling an unknown environment, the service robot 100 may generate an accurate map with information about a surrounding environment using only one or more sensors attached to the service robot 100 and without an external help, or the service robot 100 may estimate its current position through a matching between the surrounding environment and a pre-stored map by employing a technique, such as a simultaneous localization and mapping (SLAM) technique or a concurrent mapping and localization (CML) technique. Also, a technique, such as a structure from motion (SFM) technique for converting two-dimensional (2D) data of a camera to three-dimensional (3D) information may be used to generate a 3D map.

The localization module 120 may include a technique for the service robot 100 to recognize the surrounding environment and to estimate a position of the service robot 100. For example, the localization module 120 may utilize global positioning system (GPS) coordinates or a sensing value of an inertial measurement unit (IMU), and the aforementioned SLM technique.

The path planning module 130 may include a technique for setting a path for autonomous driving of the service robot 100. For example, the path planning module 130 may utilize a rapidly-exploring random tree (RRT) algorithm, an A-star algorithm for retrieving a path, a D-star algorithm, and a Dijkstra's algorithm.

The obstacle avoidance module 140 may include a technique for avoiding an unplanned obstacle, such as, for example, a person or an object, while the service robot 100 is autonomously driving along a path set according to the path planning module 130.

The sensing module 150 may include a technique for providing information used for the aforementioned mapping module 110, the localization module 120, the path planning module 130, and the obstacle avoidance module 140, using a variety of sensors included in the service robot 100, such as a camera, a lidar, an IMU, an ultrasonic sensor, and a GPS module.

Driving module 160 may include a technique for actually moving the service robot 100 by controlling, for example, wheels or legs included in the service robot 100, according to the path planning module 130 or the obstacle avoidance module 140.

As described above, in the related art, various sensors need to be included for autonomous driving of the service robot 100, and a processor configured as various modules needs to be included to process the various operations, such as the operations of the mapping module 110, the localization module 120, the path planning module 130, and the obstacle avoidance module 140, from information that is acquired by processing information of the sensors. At the same time, components, for example, wheels or legs need to be included to move the service robot 100 based on a processing result of the processor. In addition, the service robot 100 needs to further include a specific component for providing a service desired by users of the service robot 100. For example, based on an individual characteristic, a cleaning robot needs to further include a component for sucking and storing dust, and a robot for logistics management needs to further include a component for identifying and transporting objects.

Since various components are required for close connection, relatively great cost may be required to manufacture an indoor autonomous robot.

SUMMARY

One or more example embodiments provide a method and system for controlling an indoor autonomous robot that may process autonomous driving instructions based on result data provided from individual service robots and may significantly reduce service robot manufacturing cost in such a manner that a service provider generates in advance indoor maps of facilities of users, such as a large shopping mall, an airport, and a hotel, processes a localization and a path planning for the individual service robots of users while communicating with the individual service robots through a cloud service, and provides the result data thereof.

One or more example embodiments also provide a method and system for controlling an indoor autonomous robot that enables a plurality of service robots to further efficiently share and process a desired service within a single facility by controlling a service plan for the plurality of service robots through a cloud service when the plurality of service robots operates in the single facility.

One or more example embodiments also provide a method and system for controlling an indoor autonomous robot in which, when generating indoor maps of facilities of users, a service provider side may automatically generate an indoor map by including all of functions for indoor autonomous driving and a mapping function, instead of a user generating an indoor map by directly controlling measurement equipment.

According to an aspect of at least one example embodiment, there is provided a method of controlling an indoor autonomous driving of a robot in a cloud system, the method including receiving, by the cloud system, first sensing data that is generated by a mapping robot autonomously driving in a target facility using a sensor with respect to an inside of the target facility; generating an indoor map of the target facility based on the first sensing data; receiving, from a service robot present in the target facility through a network, second sensing data that is generated by the service robot using the sensor with respect to the inside of the target facility; and controlling an indoor autonomous driving of the service robot with respect to the target facility based on the second sensing data and the generated indoor map.

The mapping robot may be equipment that is operated on a service provider side providing a cloud service for controlling the indoor autonomous driving of the service robot through the cloud system, and the service robot may be equipment that is operated on a user side requesting the cloud service in association with the target facility.

The generating of the indoor map may include generating an indoor map with respect to each of target facilities of a plurality of users requesting the cloud service, and storing and managing the indoor map in association with at least one identifier among an identifier of a corresponding user, an identifier of a corresponding target facility, and an identifier of a service robot of the corresponding user, and the controlling of the indoor autonomous driving may include controlling an indoor autonomous driving of a service robot of a first user among the plurality of users based on an indoor map that is managed in association with the at least one identifier.

The receiving of the second sensing data may include receiving second sensing data from each of a plurality of service robots in response to the plurality of service robots being present in the target facility, and the controlling of the indoor autonomous driving may include controlling an indoor autonomous driving of each of the plurality of service robots according to a partition of the indoor map that is generated based on locations of the plurality of service robots verified through the second sensing data received from the plurality of service robots, or according to a service that is provided from the service robot to the target facility.

The controlling of the indoor autonomous driving may include generating path data of the service robot based on the second sensing data and the generated indoor map, and transmitting the path data to the service robot through the network, and the service robot may drive in the target facility based on the transmitted path data.

The first sensing data and the second sensing data may include interior image information of the target facility and signal information that is generated in a specific section of the target facility and used to identify the specific section, and the controlling of the indoor autonomous driving may include defining a section in which the service robot is present based on the signal information and determining a location of the service robot through matching of image information of the defined section.

An integrated development environment (IDE) for a cloud service provided to control the indoor autonomous driving of the service robot through the cloud system may be provided to the user or a manufacturer of the service robot, and the control method may further include receiving registration of software that enables the service robot to control a service provided from the target facility through the IDE; and controlling, by the service robot, the service provided from the target facility using the registered software.

According to an aspect of at least one example embodiment, there is provided a method of controlling a mapping robot, the method including generating first sensing data about an inside of a target facility using a sensor while autonomously driving in the target facility; and transmitting the generated first sensing data to a cloud system through a network. The cloud system is configured to generate an indoor map of the target facility based on the first sensing data, to receive, from a service robot present in the target facility, second sensing data that is generated by the service robot using the sensor with respect to the inside of the target facility, and to control the indoor autonomous driving of the service robot with respect to the target facility based on the second sensing data and the generated indoor map.

According to an aspect of at least one example embodiment, there is provided a method of controlling a service robot, the method including generating second sensing data about an inside of a target facility using a sensor in the target facility; transmitting the generated second sensing data to a cloud system through a network; receiving path data that is generated by the cloud system based on an indoor map of the target facility and the second sensing data; and controlling the service robot to move based on the generated path data. The cloud system is configured to generate the indoor map of the target facility based on first sensing data that is generated by a mapping robot autonomously driving in the target facility using the sensor with respect to the inside of the target facility.

According to an aspect of at least one example embodiment, there is provided a non-transitory computer-readable recording medium storing a program to implement the control method.

According to an aspect of at least one example embodiment, there is provided a computer program stored in a non-transitory computer-readable recording medium to execute the control method in conjunction with a computer.

According to an aspect of at least one example embodiment, there is provided a cloud system for controlling an indoor autonomous driving of a robot, the cloud system including at least one processor configured to execute computer-readable instructions. The at least one processor is configured to control the cloud system to receive first sensing data that is generated by a mapping robot autonomously driving in a target facility using a sensor with respect to an inside of the target facility, control the cloud system to generate an indoor map of the target facility based on the first sensing data, control the cloud system to receive, from a service robot present in the target facility, second sensing data that is generated by the service robot using the sensor with respect to the inside of the target facility, and control the cloud system to control an indoor autonomous driving of the service robot with respect to the target facility based on the second sensing data and the generated indoor map.

According to an aspect of at least one example embodiment, there is provided a mapping robot for indoor autonomous driving, the mapping robot including a sensing device including a plurality of sensors and configured to generate first sensing data including output values of the plurality of sensors; a driving device configured to move the mapping robot; a controller configured to control the driving device to autonomously drive in the target facility based on the first sensing data; and a communication device configured to transmit the generated first sensing data to the cloud system through a network. The cloud system is configured to generate an indoor map of the target facility based on the first sensing data, to receive, from a service robot present in the target facility, second sensing data that is generated by the service robot with respect to the inside of the target facility using the sensor, and to control the indoor autonomous driving the service robot with respect to the target facility based on the second sensing data and the generated indoor map.

According to an aspect of at least one example embodiment, there is provided a service robot for an indoor autonomous driving, the service robot including a sensing device including a plurality of sensors and configured to generate second sensing data including output values of the plurality of sensors; a driving device configured to move the service robot; a communication device configured to transmit the second sensing data to a cloud system through a network, and to receive path data that is generated by the cloud system based on an indoor map of a target facility and the second sensing data; and a controller configured to control the driving device to autonomously drive inside the target facility based on the generated path data. The cloud system is configured to generate the indoor map of the target facility based on first sensing data that is generated by a mapping robot autonomously driving in the target facility using a sensor with respect to an inside of the target facility.

According to some example embodiments, it is possible to process autonomous driving based on result data provided from individual service robots and to significantly reduce service robot manufacturing cost in such a manner that a service provider generates in advance indoor maps of facilities of users, such as a large shopping mall, an airport, and a hotel, processes a localization and a path planning for the individual service robots of users while communicating with the individual service robots through a cloud service, and provides the result data thereof.

Also, according to some example embodiments, a plurality of service robots may further efficiently share and process a desired service within a single facility by controlling a service plan for the plurality of service robots through a cloud service when the plurality of service robots operates in the single facility.

Also, according to some example embodiments, when generating indoor maps of facilities of users, a service provider side may automatically generate an indoor map by including all of functions for indoor autonomous driving and a mapping function, instead of a user generating an indoor map by directly controlling measurement equipment.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
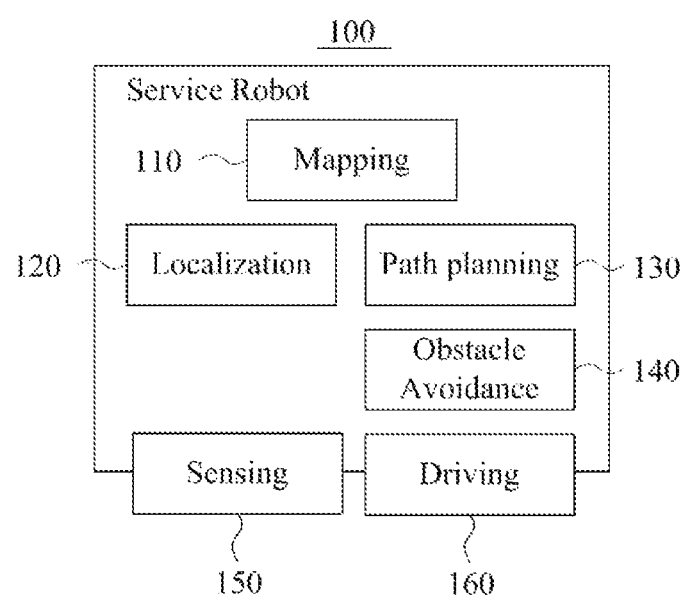
FIG. 1 is a diagram illustrating an example of a technique applied to a robot for indoor autonomous driving according to a related art.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units (or modules) that perform various operations and/or functions to increase the clarity of the description. However, computer processing devices are not intended to be limited to these functional units (modules). For example, in one or more example embodiments, the various operations and/or functions of the functional units (modules) may be performed by other ones of the functional units (modules). Further, the computer processing devices may perform the operations and/or functions of the various functional units (modules) without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like non-transitory computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The entire control system for indoor autonomous driving of a robot according to example embodiments may include a control system (hereinafter, a mapping robot system) for a mapping robot configured to collect map data in a facility, a control system (hereinafter, a cloud system) for a cloud service for generating an indoor map of the corresponding facility based on map data collected by the mapping robot and processing a localization and a path planning for autonomous driving of a service robot operating in the facility, and a control system (hereinafter, a service robot system) for a service robot that provides a desired service to a user of the facility through autonomous driving in the facility.

Figure 2:
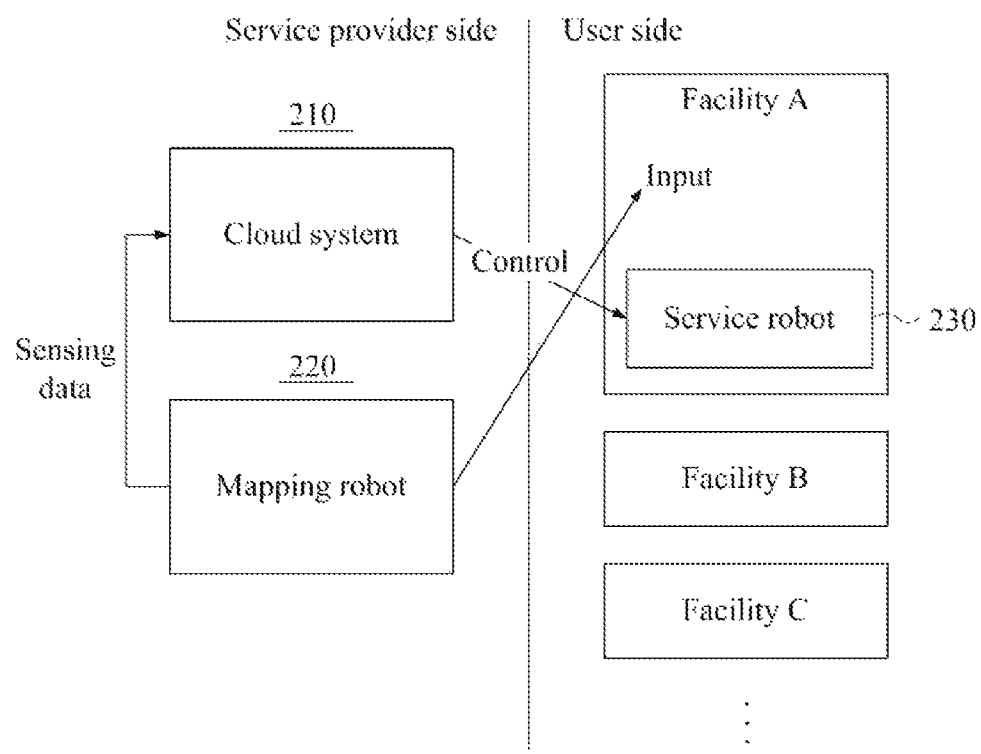
FIG. 2 is a diagram illustrating an example of a control system for indoor autonomous driving according to at least one example embodiment.

FIG. 2 is a diagram illustrating an example of a control system for indoor autonomous driving of a robot according to at least one example embodiment. FIG. 2 illustrates a cloud system 210 and a mapping robot 220 for a service provider side, and facilities of users and a service robot 230 for a user side. The service provider side may generate indoor maps of facilities of users using the mapping robot 220. Here, the service provider side may generate, in advance, indoor maps of various facilities, such as a large mart, a hospital, an airport, and a hotel, and may also generate indoor maps of facilities of users requesting a service through a separate contract in response to the request. For example, the service provider side may generate an indoor map of a facility A by putting the mapping robot 220 into the facility A in response to a request from a user of the facility A. The mapping robot 220, as an indoor autonomous robot, may include various sensors, for example, a three-dimensional (3D) lidar, a 360-degree camera, and an inertial measurement unit (IMU), for autonomous driving and map generation. The mapping robot 220 may transmit, to the cloud system 210, sensing data that is generated while autonomously driving in the facility A. Here, depending on example embodiments, once autonomous driving of the mapping robot 220 for generating an indoor map is completed, sensing data may be input to the cloud system 210 through a computer-readable recording medium configured to store the sensing data. The mapping robot 220 may include a communication module and may transmit the sensing data to the cloud system 210 over a network. Also, sensing data generated by the mapping robot 220 may be transmitted from the mapping robot 220 to the cloud system 210 in real time. Alternatively, once the mapping robot 220 completes sensing of the facility, the sensing data may be collectively transmitted to the cloud system 210.

The cloud system 210 may generate the indoor map of the facility A based on the sensing data provided from the mapping robot 220, and may control the service robot 230 by communicating with the service robot 230 provided in the facility A based on the generated indoor map. For example, the cloud system 210 may receive sensing data (for example, data for verifying a current position of the service robot 230) generated using sensors included in the service robot 230, may process a localization and a path planning for the service robot 230 based on the received sensing data and the indoor map of the facility A, and may provide result data (for example, path data used when the service robot 230 moves while autonomously driving) to the service robot 230. Here, the service robot 230 may provide a desired service inside the facility A while performing autonomous driving based on the result data provided from the cloud system 210.

The mapping robot 220 operates in a corresponding facility, for example, the facility A, only once (for an original mapping) or when a change is made to the indoor map or after a significantly long time interval from the original mapping (for example, one year) in which a change may have been made to the indoor map with respect to the facility A. Accordingly, a single mapping robot 220 may be used to generate indoor maps of a plurality of facilities based on the number of facilities of which indoor maps are required to be generated and a time scheduling. Thus, there is no need to use a plurality of mapping robots 220. Although the indoor maps are generated using expensive equipment, it may not cause a great burden on the user side. On the other hand, when the respective users individually generate and utilize the service robots 230 that operate for the respective individual purposes, each of the service robots 230 needs to continuously operate in a corresponding single facility and, in many cases, a plurality of service robots 230 may need to simultaneously operate in a single facility. Accordingly, the user side may not readily use the expensive equipment. According to example embodiments, the service provider side may generate the indoor map of the facility A using the mapping robot 220 and the service robot 230 (or multiple robots) may be controlled through the cloud system to process a desired service within the corresponding facility A without using the expensive equipment.

For example, a lidar is a radar that is developed using a laser ray having a property close to a radio wave, and it is expensive sensor equipment that is provided for autonomous driving. In the case of using the lidar, at least two lidars are basically included in a single autonomous driving unit. For example, with the assumption that a user uses 60 service robots 230 for logistics management, 120 expensive lidars are required in the related art. According to the example embodiments, once the cloud system 210 of the service provider side processes a localization and a path planning required for autonomous driving and provides result data, the service robots 230 may drive based on the result data provided from the cloud system 210. Accordingly, indoor driving is enabled using a low-cost ultrasonic sensor and/or camera only instead of using expensive sensor equipment. As a matter of fact, since the service robots 230 according to the example embodiments operate based on the result data provided from the cloud system 210, the service robots 230 may perform indoor driving without using a separate sensor for indoor autonomous driving. Here, low-cost sensors, such as a low-cost ultrasonic sensor and/or camera may be used to verify a current position of the service robot 230 and to realize the obstacle avoidance of the service robot 230. Accordingly, users may use the service robots 230 that are manufactured at low cost. Since many users desire to use the service robot 230, and each of the users may use a plurality of service robots 230, it is possible to significantly reduce service robot manufacturing costs. For example, autonomous driving of the service robot 230 may be processed with the sensing capability of a smartphone level alone.

Also, sensing data transmitted from the service robot 230 to the cloud system 210 may include information used to define a current position of the service robot 230 in the facility. The information used to define the position may include image information recognized using a low-cost camera. For example, the cloud system 210 may compare the received image information and an image of the indoor map, and may verify the position of the service robot 230. As another example, existing known techniques may be used to verify an indoor position. For example, a person of ordinary skill in the art may easily understand that existing known techniques for verifying an indoor position using, for example, a wireless fidelity (WiFi) signal or a beacon, a sound inaudible to a human being, and a Bluetooth fingerprint may be used to verify a current position of the service robot 230. It is possible to verify an approximate position of the service robot 230 using the existing techniques and to verify an accurate position of the service robot 230 through image matching. In this case, since matching processing of images corresponding to the entire indoor map is not required, the image matching range may be reduced through the approximately verified position.

Figure 3:
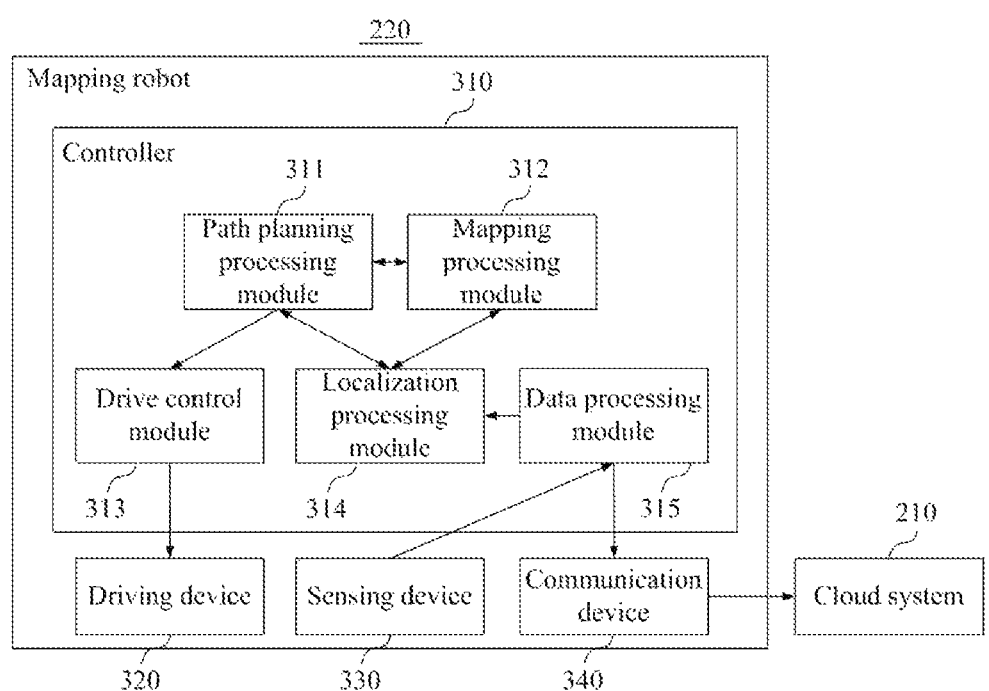
FIG. 3 is a block diagram illustrating an example of a configuration of a mapping robot according to at least one example embodiment.
Figure 4:
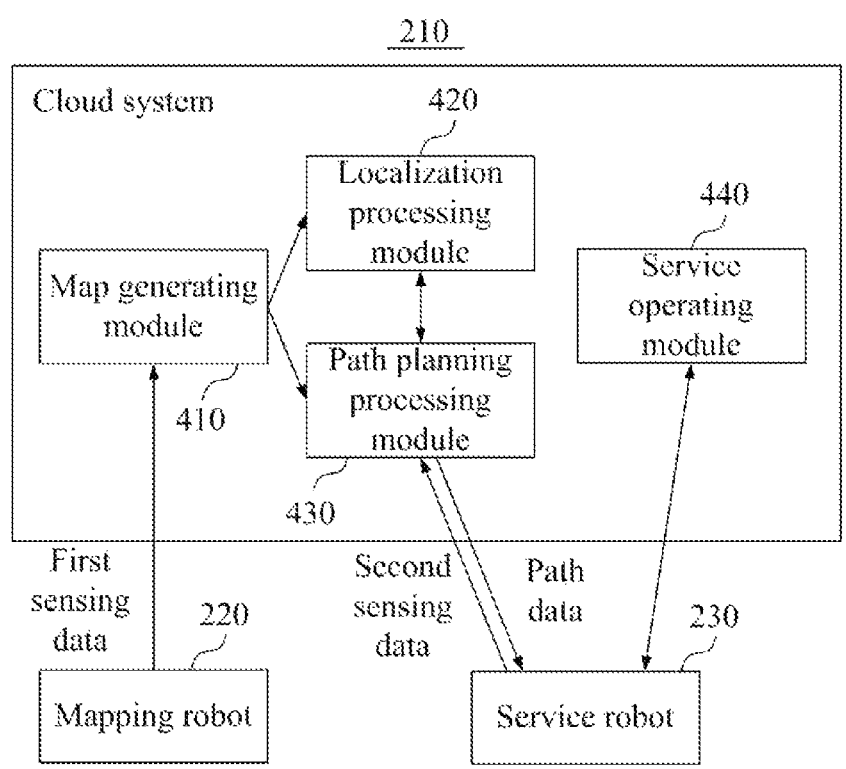
FIG. 4 is a block diagram illustrating an example of a configuration of a cloud system according to at least one example embodiment.
Figure 5:
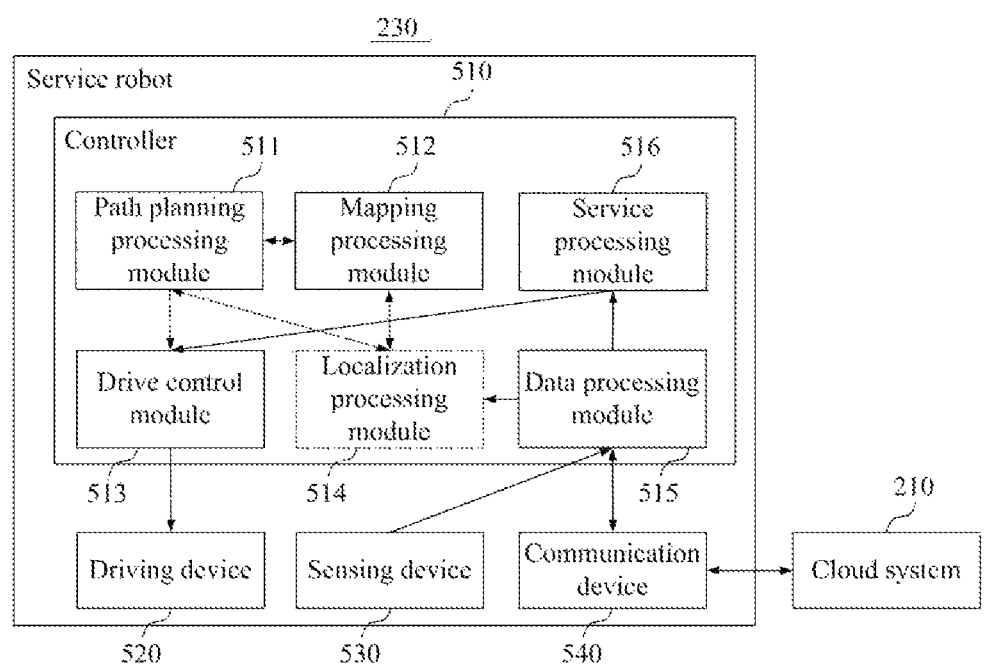
FIG. 5 is a block diagram illustrating an example of a configuration of a service robot according to at least one example embodiment.

FIG. 3 is a block diagram illustrating an example of a configuration of a mapping robot according to at least one example embodiment, FIG. 4 is a block diagram illustrating an example of a configuration of a cloud system according to at least one example embodiment, and FIG. 5 is a block diagram illustrating an example of a configuration of a service robot according to at least one example embodiment.

Referring to FIG. 3, the mapping robot 220 may be a physical device and may include a controller 310, a driving device 320, a sensing device 330, and a communication device 340.

The controller 310 may be a physical device embedded in the mapping robot 220, and, referring to FIG. 3, may include a path planning processing module 311, a mapping processing module 312, a drive control module 313, a localization processing module 314, and a data processing module 315. Here, components included in the controller 310 may be representations of different functions that are performed by the controller 310 as a physical processor. For example, the controller 310 may process various functions in response to a control instruction according to a code of a computer program, such as firmware or an operating system (OS).

The driving device 320 may include wheels or legs for movement of the mapping robot 220, and/or physical equipment for navigation of the mapping robot 220 that is in a form of a flight object, such as a drone.

The sensing device 330 may include various sensors to collect information associated with an interior environment of a facility in which the mapping robot 220 is present. For example, the sensing device 330 may include necessary sensors among the various sensor, such as a lidar, a 360-degree camera, an IMU (inertial measurement unit), an ultrasonic sensor, a GPS module, and a position sensitive detector (PSD).

The communication device 340 may include components to perform a communication function for transmitting data sensed through the sensing device 330 to the cloud system 210 over a network.

Once the mapping robot 220 located in a target facility is driven, the sensing device 330 may generate first sensing data including output values of various sensors, and may transfer the first sensing data to the controller 310. Here, the data processing module 315 of the controller 310 may transfer the transferred first sensing data to the localization processing module 314 for autonomous driving of the mapping robot 220, and may control the communication device 340 to transmit the first sensing data to the cloud system 210 over the network so that the cloud system 210 may generate an indoor map of the target facility.

The localization processing module 314, as a technique for the mapping robot 220 to recognize a surrounding environment and to estimate a position of the mapping robot 220, may operate to determine a current position of the mapping robot 220 in the target facility. Here, the localization processing module 314 may process mapping between a pre-stored indoor map (for example, a blueprint of the target facility) of the target facility and the current position of the mapping robot 220 in conjunction with the mapping processing module 312, or may generate the indoor map of the target facility in response to the absence of the pre-stored indoor map.

Here, the path planning processing module 311 may generate a path for autonomous driving of the mapping robot 220. In this case, information associated with the path generated by the path planning processing module 311 may be transferred to the drive control module 313, and the drive control module 313 may control the driving device 320 to move the mapping robot 220 along the provided path based on the information received from the path planning processing module 311.

The mapping robot 220 may autonomously drive in the target facility while repeating the aforementioned process of generating and transmitting first sensing data, determining an autonomous driving path based on the first sensing data, and moving along the determined autonomous driving path. Also, the mapping robot 220 may continuously transmit the first sensing data about the target facility to the cloud system 210.

Referring to FIG. 4, the cloud system 210 may be configured using a single physical server device or through interaction between two or more physical server devices. The cloud system 210 may include a map generating module 410, a localization processing module 420, a path planning processing module 430, and a service operating module 440. Components included in the cloud system 210 may be representations of different functions that are performed by at least one processor included in the cloud system 210 in response to a control instruction according to a code of an OS or a code of at least one computer program.

As described above with FIG. 3, the map generating module 410 may be a component used to generate an indoor map of the target facility based on first sensing data that is generated by the mapping robot 220 autonomously driving in the target facility with respect to an inside of the target facility.

Here, the localization processing module 420 may determine a position of the service robot 230 in the target facility based on second sensing data that is received from the service robot 230 over the network and the indoor map of the target facility that is generated by the map generating module 410.

The path planning processing module 430 may generate a control signal for controlling indoor autonomous driving of the service robot 230 based on the aforementioned second sensing data and the generated indoor map. For example, the path planning processing module 430 may generate path data of the service robot 230. The cloud system 210 may transmit the generated path data to the service robot 230 over the network. For example, information for the path may include information indicating a current position of the service robot 230, information for mapping the current position of the service robot 230 and the indoor map, and path planning information.

The service operating module 440 may include a function for controlling a service provided from the service robot 230 in the target facility. For example, a service provider that operates the cloud system 210 may provide an integrated development environment (IDE) for a cloud service that is provided from the cloud system 210 to a manufacturer or a user of the service robot 230. Here, the manufacturer or the user of the service robot 230 may manufacture software for a service that is provided from the service robot 230 in the target facility through the IDE and may register the software to the cloud system 210. In this case, the service operating module 440 may control the service provided from the service robot 230, using the software that is registered in association with the corresponding service robot 230. In detail, with the assumption that the service robot 230 provides a service for delivering an object requested by a customer to a room of the customer in a hotel, for example. Here, the cloud system 210 may control the service robot 230 to move in front of the corresponding room by controlling the indoor autonomous driving of the service robot 230. Also, the cloud system 210 may transfer a related instruction to the service robot 230 to proceed with a series of service actions of pushing a door bell of the room and outputting a sound for responding to the customer if the service robot 230 arrives at a target position, and delivering the object to the customer.

Referring to FIG. 5, the service robot 230 may be a physical device and may include a controller 510, a driving device 520, a sensing device 530, and a communication device 540.

The controller 510 may be a physical processor that is embedded in the service robot 230, and, referring to FIG. 5, may include a path planning processing module 511, a mapping processing module 512, a drive control module 513, a localization processing module 514, a data processing module 515, and a service processing module 516. Here, depending on example embodiments, the path planning processing module 511, the mapping processing module 512, and the localization processing module 514 may be selectively included in the controller 510 so that indoor autonomous driving may still be performed even when communication with the cloud system 210 has failed.

The data processing module 515 may receive second sensing data that includes output values of sensors of the sensing device 530, and may transmit the received second sensing data to the cloud system 210 through the communication device 540. As described above, the cloud system 210 may generate path data based on the second sensing data and an indoor map of a target facility, and may transmit the generated path data to the service robot 230. In this case, the path data may be transferred to the data processing module 515 through the communication device 540.

In general, the data processing module 515 may immediately transfer the path data to the drive control module 513. The drive control module 513 may control the driving device 520 to control the indoor autonomous driving of the service robot 230 based on the path data.

If communication between the data processing module 515 and the cloud system 210 is impossible due to a communication failure, the data processing module 515 may transmit the second sensing data to the localization processing module 514, may generate the path data using the path planning processing module 511 and the mapping processing module 512, and may directly process the indoor autonomous driving of the service robot 230. In this case, dissimilar to the mapping robot 220, the service robot 230 does not include expensive equipment. Thus, the service robot 230 may process the indoor autonomous driving using an output value of a sensor, such as a low-cost ultrasonic sensor and/or a low-cost camera. If the service robot 230 has processed the indoor autonomous driving through communication with the existing cloud system 210, the service robot 230 may process further accurate indoor autonomous driving using low-cost sensors by further utilizing mapping data that is included in the existing path data received from the cloud system 210.

Meanwhile, the service processing module 516 may receive an instruction from the cloud system 210 through the communication device 540, or through the communication device 540 and the data processing module 515. In this case, the driving device 520 may further include equipment for movement of the service robot 230 and equipment associated with a service that is provided from the service robot 230. In the aforementioned hotel service example, the driving device 520 of the service robot 230 may further include a robot arm configured to push a door bell of the room or a speaker configured to output a sound for responding to the customer. In this case, the service processing module 516 may transfer a driving instruction for a service to be provided to the drive control module 513. The drive control module 513 may control the robot arm or the speaker further included in the driving device 520 in response to the driving instruction, so that the service may be provided.

Figure 6:
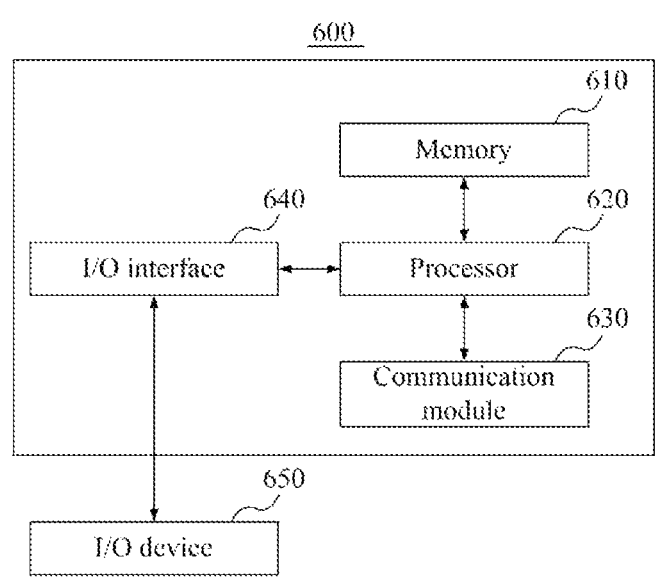
FIG. 6 is a block diagram illustrating an example of a configuration of a physical server that constitutes a cloud service according to at least one example embodiment.

FIG. 6 is a block diagram illustrating an example of a configuration of a physical server that constitutes a cloud system according to at least one example embodiment. The aforementioned cloud system 210 may be configured using a single physical server or through interaction between two or more physical server devices. Referring to FIG. 6, a server 600 that constitutes the cloud system 210 may include a memory 610, a processor 620, a communication module 630, and an I/O interface 640. The memory 610 may include a permanent mass storage device, such as random access memory (RAM), read only memory (ROM), a disk drive, etc., as a computer-readable storage medium. Also, ROM and the permanent mass storage device may be included as a separate permanent storage device separate from the memory 610. Also, an OS and at least one program code may be stored in the memory 610. Such software components may be loaded from another computer-readable storage medium separate from the memory 610. The other computer-readable storage medium may include, for example, any non-transitory media such as a floppy drive, a disk, a tape, a DVD/CD-ROM drive, a memory card, etc. According to other example embodiments, software components may be loaded to the memory 610 through the communication module 630, instead of, or in addition to, the computer-readable storage medium.

The processor 620 may be configured to process computer-readable instructions by performing basic arithmetic operations, logic operations, and I/O operations. The computer-readable instructions may be provided from the memory 610 or from the communication module 630 to the processor 620. For example, the processor 620 may be configured to execute received instructions in response to the program code loaded into the memory 610. The processor 620 may be included in at least one processor included in the cloud system 210 of FIG. 4.

The communication module 630 may provide a function for communication with other physical devices through an actual computer network. For example, the communication module 630 may provide a function for communicating between the server 600 and the mapping robot 220 or the service robot 230.

The I/O interface 640 may be a device to interface with an I/O device 650. For example, the I/O device 650 may include a keyboard or a mouse as an input device and may include a display or a speaker as an output device. Although FIG. 6 illustrates the I/O device 650 as a device separate from the server 600, the server 600 may be configured to include the I/O device 650 depending on example embodiments.

Also, according to other example embodiments, the server 600 may include a greater number of components than the number of components of FIG. 6. However, there is no need to clearly illustrate many components according to the related art. For example, the server 600 may further include various components, for example, various physical buttons, a touch panel, and an optical output device.

Figure 7:
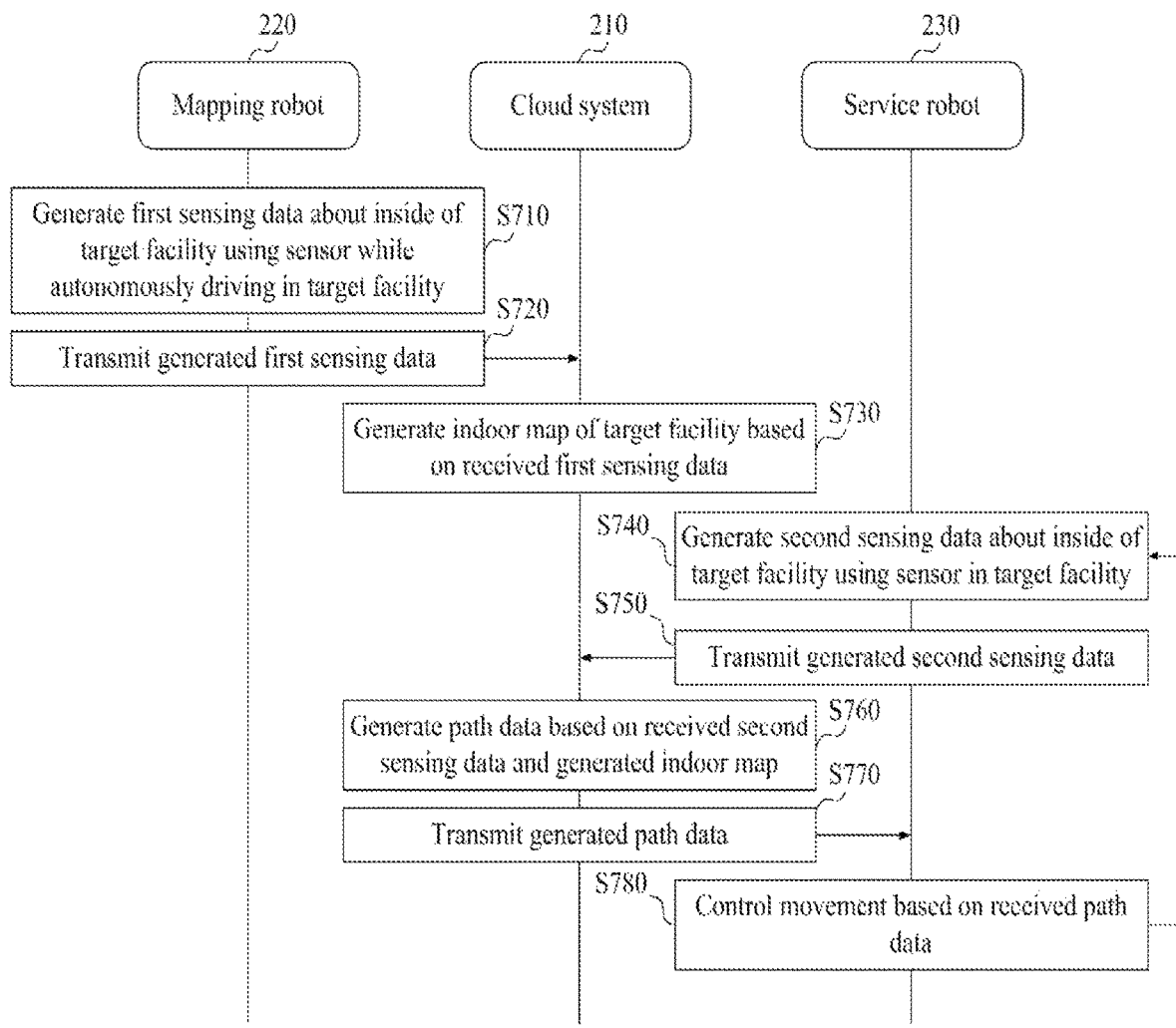
FIG. 7 is a flowchart illustrating an example of a control method according to at least one example embodiment.

FIG. 7 is a flowchart illustrating a control method according to at least one example embodiment.

Referring to FIG. 7, in operation S710, the mapping robot 220 may generate first sensing data about an inside of a target facility using a sensor while autonomously driving in the target facility. For example, as described above with FIG. 3, the mapping robot 220 may transmit the first sensing data that includes output values of the sensors to the data processing module 315 through the sensing device 330. The mapping robot 220 may include equipment that is operated on a service provider side providing a cloud service for controlling the indoor autonomous driving of the service robot 230 through the cloud system 210. Also, the service robot 230 may include equipment that is operated on a user side requesting the cloud service in association with the target facility.

In operation S720, the mapping robot 220 may transmit the generated first sensing data. For example, as described above with FIG. 3, the data processing module 315 may transmit the first sensing data that is received from the sensing device 330 to the cloud system 210 through the communication device 340.

In operation S730, the cloud system 210 may generate an indoor map of the target facility based on the received first sensing data. For example, the cloud system 210 may receive the first sensing data from the mapping robot 220 through the communication module 630 of FIG. 6, and may generate the indoor map of the target facility based on the first sensing data received from the map generating module 410 of FIG. 4. Here, the indoor map may be generated as an image-based 3D indoor map. As described above, once the autonomous driving of the mapping robot 220 is completed, the first sensing data may be collectively transferred to the cloud system 210.

Depending on example embodiments, the cloud system 210 may generate an indoor map with respect to each of the target facilities of a plurality of users. For example, first sensing data for each target facility may be acquired, and an indoor map for each target facility may be generated by putting the mapping robot 220 into each of the target facilities. In this case, the cloud system 210 may store and manage the generated indoor map in association with at least one of an identifier of a corresponding user, an identifier of a corresponding target facility, and an identifier of the service robot 230 of the corresponding user. In the case of controlling indoor autonomous driving of one of a plurality of service robots 230 of the plurality of users, the cloud system 210 may identify an indoor map for the corresponding service robot 230 based on an identifier associated with the indoor map, and may control the indoor autonomous driving of the corresponding service robot 230 based on the identified indoor map.

In operation S740, the service robot 230 may generate second sensing data about the inside of the target facility using the sensor in the target facility. For example, as described above with FIG. 5, the service robot 230 may transmit the second sensing data that includes output values of sensors to the data processing module 515 through the sensing device 530. The mapping robot 220 uses expensive sensing equipment, such as a lidar and a 360-degree camera, as sensors. On the contrary, the service robot 230 may generate the second sensing data using low-cost sensing equipment, such as a low-cost camera and/or a low-cost ultrasonic sensor, as sensors. The cloud system 210 generates in advance the indoor map of the corresponding target facility through the mapping robot 220. In this case, the cloud system 210 may control the indoor autonomous driving of the service robot 230 only with simple image mapping. Thus, the service robot 230 may be configured using low-cost sensors and accordingly, the service robot manufacturing costs for the users may be significantly reduced.

In operation S750, the service robot 230 may transmit the generated second sensing data. For example, as described above with FIG. 5, the data processing module 515 of the service robot 230 may transmit the second sensing data to the cloud system 210 through the communication device 540.

In operation S760, the cloud system 210 may generate path data based on the received second sensing data and the generated indoor map. The path data may include mapping data that is processed based on the indoor map of the target facility in the cloud system 210, path planning data, and position data that is determined with respect to the service robot 230. The processed mapping data may be, for example, a portion of the indoor map associated with the path planning data and the position data that is determined with respect to the service robot 230 at a current point in time. In detail, the mapping data may include indoor map data from a current position of the service robot 230 to a position to which the service robot 230 needs to move.

In operation S770, the cloud system 210 may transmit the generated path data. For example, the cloud system 210 may transmit, to the service robot 230 through the communication module 630 of FIG. 6, the path data that is generated by the path planning processing module 430 in association with the localization processing module 420 and the map generating module 410 of FIG. 4. Operations S760 and S770 of generating and transmitting the path data may be a process of controlling the indoor autonomous driving of the service robot 230 in the target facility based on the second sensing data and the generated indoor map. As described above, when the plurality of users use the cloud service, the cloud system 210 may generate an indoor map with respect to each of the plurality of target facilities and may identify an indoor map associated with the service robot 230 of which indoor autonomous driving is to be controlled by storing and managing the generated indoor map in association with an identifier of a corresponding user, an identifier of a corresponding target identifier, and an identifier of the service robot 230 of the user.

Also, a plurality of service robots 230 may be present in a single target facility. That is, a single user may operate the plurality of service robots 230. In this case, in operation S760, the cloud system 210 may receive second sensing data from each of the plurality of service robots 230. Also, in operation S770, the cloud system 210 may control the indoor autonomous driving of each of the plurality of service robots 230 according to a partition of the indoor map that is generated based on positions of the plurality of service robots 230 or according to a service that is provided from the corresponding service robot 230 in the target facility. Here, the positions of the plurality of service robots 230 may be verified based on the second sensing data that is received from each of the plurality of service robots 230. For example, the plurality of service robots 230 may provide a warehouse service in a warehouse. In this case, partitioned areas may be present in the warehouse so that the plurality of service robots 230 may manage the distribution. The cloud system 210 may control the indoor autonomous driving of each of the plurality of service robots 230 based on a partition of the indoor map. Also, travel paths of the plurality of service robots 230 may overlap, or each of the plurality of service robots 230 may move across all of the partitions of the indoor map according to the service. To this end, the cloud system 210 may control the indoor autonomous driving of each of the plurality of service robots 230 based on the service that is provided from the plurality of service robots 230. For example, the cloud system 210 may calculate an optimal travel path for the entire group of service robots 230 based on the current positions of the plurality of service robots 230. As another example, service robots 230 providing multiple different services may be present in a single target facility. When the plurality of service robots 230 are present in a single target facility, the cloud service 210 may be aware of a position of each of the plurality of service robots 230, and may calculate the optimal travel path based on the positions of all of the service robots 230.

In operation S780, the movement of the service robot 230 may be controlled based on the received path data. For example, the service robot 230 may receive the path data through the communication device 540 of FIG. 5, and may transfer the path data to the data processing module 515. Here, the data processing module 515 may generally transmit the path data to the drive control module 513 so that the drive control module 513 may control the driving device 520 based on the path data. Here, operations S740 through S780 may be repeated until the service robot 230 terminates its service.

Figure 8:
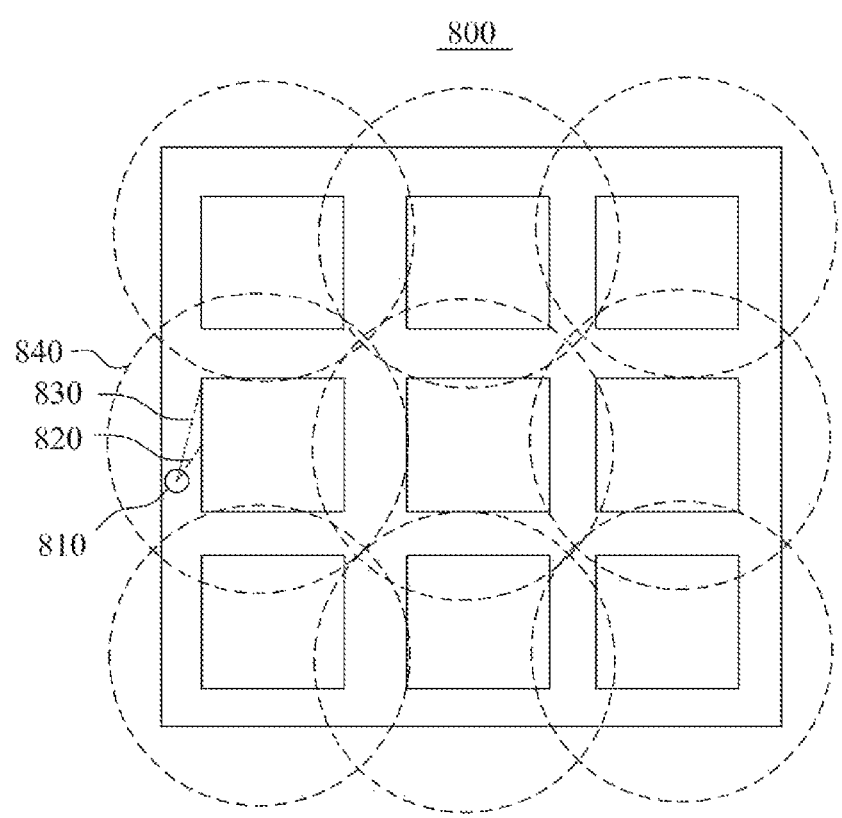
FIG. 8 illustrates an example of defining a position of a service robot according to at least one example embodiment.

FIG. 8 illustrates an example of defining a position of a service robot according to at least one example embodiment. Hereinafter, an example of a two-dimensional (2D) indoor map 800 of a target facility is described with reference to FIG. 8. Referring to FIG. 8, a solid circle 810 represents a position of the service robot 230 and dotted lines 820 and 830 represent a viewing angle of a low-cost camera included in the service robot 230. Here, second sensing data that includes an image captured through the low-cost camera may be transmitted from the service robot 230 to the cloud system 210. In this case, every time the cloud system 210 is to verify a position of the service robot 230, the cloud system 210 needs to perform image matching with respect to all of the images collected in association with the 2D indoor map 800 until a matching image of an image included in the second sensing data is found.

Accordingly, first sensing data and second sensing data received by the cloud system 210 may further include interior image information of the target facility and signal information that is generated in a specific section of the target facility and used to identify the specific section. For example, the mapping robot 220 and the service robot 230 may further include a signal detection sensor configured to detect WiFi signals that are generated by access points (APs) installed in the target facility, radio wave signals or sound signals (a sound inaudible to a human being) that are generated by signal generators constructed separately in the target facility. Signal information recognized through the signal detection sensor may be further included in each of the first sensing data and the second sensing data and thereby transmitted to the cloud system 210. Here, the WiFi signals of different APs may be distinguished from each other and the separately constructed signal generators may generate distinguishable signal information.

In this case, the cloud system 210 may easily verify a position of the mapping robot 220, and may identify a section corresponding to the signal information that is included in the first sensing data. In this case, the cloud system 210 may define a section of the service robot 230 based on the signal information included in the second sensing data. Accordingly, operation cost for image matching may be reduced.

For example, with the assumption that each circle indicated with dotted lines represents a recognizable range of signal information generated in the target facility, the service robot 230 present at a position of the solid circle 810 may include signal information corresponding to a first circle 840 indicated with dotted lines in the second sensing data and thereby transmit the signal information to the cloud system 210. In this case, the cloud system 210 may use, as image matching targets, only images of a section to which the same signal information is included in the first sensing data and transmitted from the mapping robot 220. Through this, operation cost for image matching may be reduced. Two or more pieces of different signal information may be included based on the position of the mapping robot 220 or the position of the service robot 230. In this case, compared to image matching that is performed with respect to all of images corresponding to the entire indoor map, the operation cost may be reduced.

Figure 9:
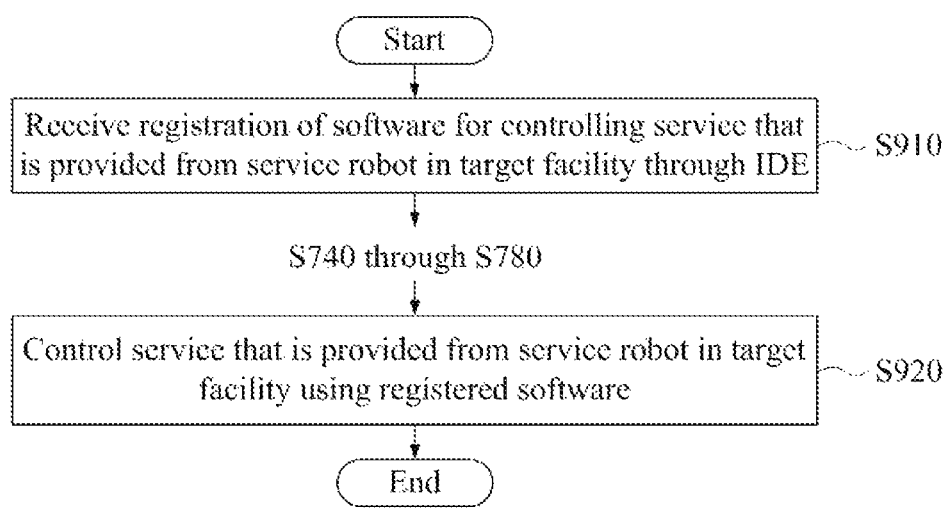
FIG. 9 is a flowchart illustrating an example of a process of controlling, by a cloud system, a service provided from a service robot according to at least one example embodiment.

FIG. 9 is a flowchart illustrating a process of controlling, through a cloud system, a service that is provided from a service robot according to at least one example embodiment. As described above, the cloud system 210 may need to control a service of the service robot 230. To this end, an IDE for a cloud service provided to control indoor autonomous driving of the service robot 230 through the cloud system 210 may be provided to a user or a manufacturer of the service robot 230. The IDE is an integrated development environment software application interface for efficiently developing software. The cloud system 210 may be provided with a function for controlling a service of the service robot 230 through the IDE.

Referring to FIG. 9, in operation S910, the cloud system 210 may receive registration of software for controlling a service that is provided from the service robot 230 in a target facility through the IDE. Operation S910 may be performed before operations S740 S780 of FIG. 7. That is, the cloud system 210 may receive the registration of software before communicating with the service robot 230 to control the indoor autonomous driving of the service robot 230. For example, the cloud system 210 may receive the registration of software and may manage the registered software through the service operating module 440 of FIG. 4.

In operation S920, the cloud system 210 may control the service that is provided from the service robot 230 in the target facility using the registered software. Here, the cloud system 210 may transfer a service related instruction to the service robot 230 according to a program code of the registered software through the service operating module 440 of FIG. 4. Accordingly, how the cloud system 210 controls the service of the service robot 230 may vary based on the software registered to the cloud system 210. Operation S920 may be performed when the service robot 230 arrives at a desired service location through the indoor autonomous driving of the service robot 230 through operations S740 through S780. For example, in a hotel, a start of a service by the service robot 230, such as pushing a door bell of a desired room or outputting a sound for communicating with a customer after arriving at the desired room, may be controlled through the cloud system 210. The service started through the cloud system 210 may be provided through the service processing module 516 of the service robot 230 of FIG. 5. For example, service robot 230 may provide a service corresponding to a control instruction from the cloud system 210. To this end, the service processing module 516 may perform a processing procedure for providing a service suitable for the control instruction.

According to some example embodiments, it is possible to process autonomous driving based on result data provided from individual service robots, and to significantly reduce service robot manufacturing cost in such a manner that a service provider generates in advance indoor maps of facilities of users, such as a large shopping mall, an airport, and a hotel, processes localization and path planning for the individual service robots of users while communicating with the individual service robots through a cloud service, and provides the result data thereof. Also, according to some example embodiments, a plurality of service robots may further efficiently share and process a desired service within a single facility by controlling a service plan for the plurality of service robots through a cloud service when the plurality of service robots operates in the single facility. Also, according to some example embodiments, when generating indoor maps of facilities of users, a service provider side may automatically generate an indoor map by including all of the functions for indoor autonomous driving and a mapping function, instead of a user generating an indoor map by directly controlling measurement equipment.

The units and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling indoor autonomous driving of a robot through a cloud system, the method comprising:
receiving, by the cloud system, first sensing data that is generated by at least one dedicated mapping robot for mapping inside of a plurality of target buildings, the at least one dedicated mapping robot being configured to autonomously drive within the plurality of target buildings associated with a plurality of users requesting a cloud service, using a first sensor of the dedicated mapping robot, including at least one of a LIDAR and an IMU, that detects the first sensing data with respect to an inside of each of the plurality of target buildings;
generating, by the cloud system, an indoor map corresponding to each of the plurality of target buildings, based on the first sensing data;
storing each of the indoor maps in association with corresponding identifier of at least one of first identifiers of the users, second identifiers of the target buildings, and third identifiers of service robots of the users,
receiving, through a network by the cloud system, second sensing data that is generated by a dedicated service robot present in corresponding one of the plurality of the target buildings for performing at least one predefined service within the corresponding one of the plurality of target buildings, the second sensing data being generated using a second sensor of the dedicated service robot, excluding a LIDAR and an IMU, that detects the second sensing data with respect to the inside of the corresponding one of the plurality of target buildings; and
controlling an indoor autonomous driving of the dedicated service robot with respect to the corresponding one of the plurality of target buildings based on the second sensing data and the corresponding indoor map generated based on the first sensing data from the dedicated mapping robot,
wherein the dedicated service robot being controlled is a dedicated service robot of a first user among the users using an indoor map among the indoor maps identified based on the corresponding identifier;
wherein the at least one dedicated mapping robot is dedicated to generating only the indoor map, without performing the at least one predefined service of the dedicated service robot, and the dedicated service robot is dedicated to perform the at least one predefined service without generating sensing data for use in generating the indoor map, and
wherein the second sensing data from the dedicated service robot is used only for controlling the indoor autonomous driving of the dedicated service robot, and not for generating and updating the indoor map.

2. The method of claim 1, wherein the dedicated mapping robot includes equipment that is operated on a service provider side providing a cloud service for controlling the indoor autonomous driving of the dedicated service robot through the cloud system, and
the dedicated service robot includes equipment that is operated on a user side requesting the cloud service in association with the corresponding one of the plurality of target buildings.

3. The method of claim 1, wherein the receiving of the second sensing data comprises receiving second sensing data from each of a plurality of dedicated service robots in response to the plurality of dedicated service robots being present in the corresponding plurality of target buildings, and
the controlling of the indoor autonomous driving comprises controlling indoor autonomous driving of each of the plurality of dedicated service robots according to a partition of the indoor map that is generated based on locations of the plurality of dedicated service robots verified through the second sensing data received from the plurality of dedicated service robots, or according to a service that is provided from the dedicated service robot to the target building.

4. The method of claim 1, wherein the controlling of the indoor autonomous driving comprises generating path data of the dedicated service robot based on the second sensing data and the generated indoor map, and transmitting the path data to the dedicated service robot through the network, and
the dedicated service robot drives in the corresponding one of the plurality of target buildings as based on the transmitted path data.

5. The method of claim 1, wherein the first sensing data and the second sensing data comprise interior image information of the corresponding one of the plurality of target buildings and signal information that is generated in a specific section of the corresponding one of the plurality of target buildings and used to identify the specific section, and
the controlling of the indoor autonomous driving comprises defining a section in which the dedicated service robot is present based on the signal information and determining a location of the dedicated service robot through matching of image information of the defined section.

6. The method of claim 1, wherein an integrated development environment (IDE) for a cloud service provided to control the indoor autonomous driving of the dedicated service robot through the cloud system is provided to the user or a manufacturer of the dedicated service robot, and the method further comprises:
receiving registration of software that enables the dedicated service robot to control a service provided in the corresponding one of the plurality of target buildings through the IDE; and
controlling, by the dedicated service robot, the service provided in the corresponding one of the plurality of target buildings using the registered software.

7. A cloud system for controlling an indoor autonomous driving of a robot, the cloud system comprising:
at least one processor configured to execute computer-readable instructions,
wherein the at least one processor is configured to:
control the cloud system to receive first sensing data that is generated by at least one dedicated mapping robot for mapping inside of plurality of target buildings, the at least one dedicated mapping robot being configured to autonomously drive in the plurality of target buildings using a first sensor of the dedicated mapping robot, including at least one of a LIDAR and an IMU, that detects the first sensing data with respect to an inside of each of the plurality of target buildings, control the cloud system to generate an indoor map corresponding to each of the plurality of target buildings based on the first sensing data, store each of the indoor maps in association with corresponding identifier of at least one of first identifiers of the users, second identifiers of the target buildings, and third identifiers of service robots of the users, control the cloud system to receiver second sensing data from a dedicated service robot present in corresponding one of the plurality of the target buildings for performing at least one predefined service within the corresponding one of the plurality of the target buildings, the second sensing data that being generated by the dedicated service robot using a second sensor, excluding a LIDAR and an IMU, that detects the second sensing data with respect to the inside of the corresponding one of the plurality of target building, and control the cloud system to control indoor autonomous driving of the dedicated service robot with respect to the corresponding one of the plurality of target buildings based on the second sensing data and the corresponding indoor map generated based on the first sensing data from the dedicated mapping robot, wherein the dedicated service robot being controlled is a dedicated service robot of a first user among the users using an indoor map among the indoor maps identified based on the corresponding identifier, wherein the at least one dedicated mapping robot is dedicated to generating only the indoor map, without performing the at least one predefined service of the dedicated service robot, and the dedicated service robot is dedicated to perform the at least one predefined service without generating sensing data for use in generating the indoor map, and wherein the second sensing data from the dedicated service robot is used only for controlling the indoor autonomous driving of the dedicated service robot, and not for generating and updating the indoor map.

8. The cloud system of claim 7, wherein the dedicated mapping robot includes equipment that is operated on a service provider side providing a cloud service for controlling the indoor autonomous driving of the dedcated service robot through the cloud system, and the dedicated service robot includes equipment that is operated on a user side requesting the cloud service in association with the corresponding one of the plurality of target buildings.

9. The cloud system of claim 8, wherein the at least one processor is configured to:

control the cloud system to receive second sensing data from each of a plurality of dedicated service robots in response to the plurality of dedicated service robots being present in the corresponding plurality of target buildings, and control the cloud system to control indoor autonomous driving of each of the plurality of dedicated service robots according to a partition of the indoor map that is generated based on locations of the plurality of dedicated service robots verified through the second sensing data received from the plurality of dedicated service robots, or according to a service that is provided from the dedicated service robot to the target building.

10. The cloud system of claim 8, wherein the at least one processor is configured to control the cloud system to generate path data of the dedicated service robot based on the second sensing data and the generated indoor map, and to transmit the path data to the dedicated service robot through the network, and the dedicated service robot drives in the corresponding one of the plurality of target buildings based on the transmitted path data.

11. The cloud system of claim 8, wherein the first sensing data and the second sensing data comprise interior image information of the corresponding one of the plurality of target buildings and signal information that is generated in a specific section of the corresponding one of the plurality of target building and used to identify the specific section, and the at least one processor is configured to define a section in which the dedicated service robot is present based on the signal information and to determine a location of the dedicated service robot through matching of image information of the defined section.

12. The cloud system of claim 7, wherein the at least one dedicated mapping robot comprises:

a sensing device comprising a plurality of sensors including the first sensor and configured to generate the first sensing data including output values of the plurality of sensors;

a driving device configured to move the dedicated mapping robot;

a controller configured to control the driving device to autonomously drive in the plurality of target buildings based on the first sensing data; and a communication device configured to transmit the generated first sensing data to the cloud system through a network.

13. A dedicated service robot for performing at least one predefined service within a corresponding one of the plurality of target buildings, comprising:

a sensing device comprising a plurality of sensors, excluding a LI DAR and an IMU, and configured to generate second sensing data including output values of the plurality of sensors;

a driving device configured to move the dedicated service robot;

a communication device configured to transmit the second sensing data to a cloud system through a network, and to receive path data that is generated by the cloud system based on an indoor map of the corresponding one of the plurality of target buildings and the second sensing data; and a controller configured to control the driving device to autonomously drive in the corresponding one of a plurality of target buildings based on the generated path data, wherein the cloud system is configured to generate an indoor map corresponding to each of the plurality of target buildings based on first sensing data that is generated by at least one dedicated mapping robot autonomously driving in the plurality of target buildings using a sensor, including at least one of a LI DAR and an IMU, that detects first sensing data with respect to an inside of the plurality of target buildings, wherein the at least one dedicated mapping robot is dedicated to generating only the indoor map, without performing the at least one predefined service of the dedicated service robot, and the dedicated service robot is dedicated to perform the at least one predefined service without generating sensing data for use in generating the indoor map, and wherein the second sensing data from the dedicated service robot is used only for controlling the indoor autonomous driving of the dedicated service robot, and not for generating and updating the indoor map.

14. The service robot of claim 13, wherein an integrated development environment (IDE) for a cloud service provided to control the indoor autonomous driving of the dedicated service robot through the cloud system is provided to the user or a manufacturer of the dedicated service robot, and software that enables the dedicated service robot to control the service provided in the corresponding one of the plurality of target buildings through the IDE is registered to the cloud system, and wherein a service is provided in response to a control instruction from the cloud system using the registered software.

* * * * *